United States Patent
Bollay et al.

(10) Patent No.: US 7,953,087 B1
(45) Date of Patent: May 31, 2011

(54) CONTENT FILTERING USING STATIC SOURCE ROUTES

(75) Inventors: Benn Bollay, San Luis Obispo, CA (US); David B. Donahue, Mountain View, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 2181 days.

(21) Appl. No.: 10/040,773

(22) Filed: Dec. 28, 2001

(51) Int. Cl.
*H04L 12/56* (2006.01)
*G06F 15/16* (2006.01)

(52) U.S. Cl. .......... 370/392; 709/203; 713/154; 726/12; 726/13

(58) Field of Classification Search .............. 370/401, 370/389, 392, 396, 428; 709/238, 239
See application file for complete search history.

(56) References Cited

U.S. PATENT DOCUMENTS

| | | | |
|---|---|---|---|
| 5,696,898 A | 12/1997 | Baker et al. | |
| 5,706,507 A | 1/1998 | Schloss | |
| 5,781,550 A * | 7/1998 | Templin et al. | 370/401 |
| 5,809,144 A | 9/1998 | Sirbu et al. | |
| 5,835,727 A * | 11/1998 | Wong et al. | 709/238 |
| 5,848,418 A | 12/1998 | De Souza et al. | |
| 5,856,974 A * | 1/1999 | Gervais et al. | 370/392 |
| 5,884,033 A | 3/1999 | Duvall et al. | |
| 5,903,732 A | 5/1999 | Reed et al. | |
| 5,937,404 A | 8/1999 | Csaszar et al. | |
| 5,987,611 A | 11/1999 | Freund | |
| 5,996,011 A | 11/1999 | Humes | |
| 6,006,264 A * | 12/1999 | Colby et al. | 709/226 |
| 6,006,268 A * | 12/1999 | Coile et al. | 709/227 |
| 6,037,934 A | 3/2000 | Himmel et al. | |
| 6,041,360 A | 3/2000 | Himmel et al. | |
| 6,055,364 A * | 4/2000 | Speakman et al. | 709/229 |
| 6,092,110 A | 7/2000 | Maria et al. | |
| 6,098,108 A * | 8/2000 | Sridhar et al. | 709/239 |
| 6,141,749 A * | 10/2000 | Coss et al. | 713/162 |
| 6,154,775 A * | 11/2000 | Coss et al. | 709/225 |
| 6,189,042 B1 * | 2/2001 | Keller-Tuberg | 709/238 |
| 6,202,081 B1 * | 3/2001 | Naudus | 709/200 |
| 6,219,706 B1 * | 4/2001 | Fan et al. | 709/225 |
| 6,233,618 B1 * | 5/2001 | Shannon | 709/229 |
| 6,243,815 B1 * | 6/2001 | Antur et al. | 726/11 |
| 6,256,671 B1 | 7/2001 | Strentzsch et al. | |
| 6,260,070 B1 * | 7/2001 | Shah | 709/230 |
| 6,266,707 B1 * | 7/2001 | Boden et al. | 709/245 |
| 6,275,846 B1 * | 8/2001 | Kondo et al. | 709/200 |
| 6,286,049 B1 * | 9/2001 | Rajakarunanayake et al. | 709/227 |
| 6,377,808 B1 * | 4/2002 | Korneluk et al. | 455/445 |
| 6,415,289 B1 * | 7/2002 | Williams et al. | 707/10 |
| 6,560,233 B1 * | 5/2003 | Hatanaka et al. | 370/401 |

(Continued)

OTHER PUBLICATIONS

Rigney, Steve, "Surveying the Wave", PC Magazine, May 6, 1997, vol. 16, p. 9.

*Primary Examiner* — Gregory B Sefcheck (57) ABSTRACT

A packet containing a request for content is initially received at a content filtering router. The packet comprises a first destination Internet Protocol (IP) address of a content server that stores the content and a second destination IP address of the content filtering router. It is then ascertained that the first IP address is on a list of destination IP addresses to be filtered and the packet is, therefore, routed someplace other than the first destination IP address, such as to a port that discards the packet.

25 Claims, 11 Drawing Sheets

U.S. PATENT DOCUMENTS

| | | | |
|---|---|---|---|
| 6,598,077 B2 * | 7/2003 | Primak et al. | 709/219 |
| 6,606,315 B1 * | 8/2003 | Albert et al. | 370/352 |
| 6,700,891 B1 * | 3/2004 | Wong | 370/401 |
| 6,742,047 B1 * | 5/2004 | Tso | 709/246 |
| 7,016,980 B1 * | 3/2006 | Mayer et al. | 709/249 |
| 7,023,851 B2 * | 4/2006 | Chakravorty | 370/392 |
| 7,031,297 B1 * | 4/2006 | Shabtay et al. | 370/352 |
| 7,039,053 B1 * | 5/2006 | Freed et al. | 370/392 |
| 7,065,082 B2 * | 6/2006 | Ganesh et al. | 370/392 |
| 7,149,219 B2 * | 12/2006 | Donahue | 370/392 |
| 2002/0032870 A1 | 3/2002 | Spusta | |
| 2002/0059451 A1 * | 5/2002 | Haviv | 709/238 |
| 2003/0165139 A1 * | 9/2003 | Chen et al. | 370/392 |

* cited by examiner

CONTENT FILTERING USING STATIC SOURCE ROUTES

BACKGROUND OF THE INVENTION

1. Field of the Invention

The invention relates to a content filtering system and more particularly to a system and method for controlling user access to a computer network using a content filtering router that filters requests for content by routing them based on their final destination addresses.

2. Description of the Related Art

The Internet is a loose network of networked computers spread throughout the world. Many of these networked computers serve content, such as Web pages, that are publicly accessible. This content is typically located through Internet addresses, such as <http://www.company.com/info/>, which usually consist of the access protocol or scheme, such as HyperText Transport Protocol (http), the domain name (www.company.com), and optionally the path to a file or resource residing on that server (info). This Internet address is also known as a Uniform Resource Locator (URL). A Domain Name System (DNS) is then used to convert the domain name of a specific computer on the network into a corresponding unique Internet Protocol (IP) address, such as 204.171.64.2.

Typically, users access content in one of two ways. The user can enter a URL into a text or address box on a Graphical User Interface (GUI) of a file manager or an Internet browser, such as MICROSOFT'S INTERNET EXPLORER™, and click "Go" or press "Enter." Alternatively, the user can click on a Hyperlink. The Hyperlink links a displayed object, such as text or an icon, to a file addressed by a URL.

As the Internet grows in size and sophistication, more and more content is becoming accessible to users. This content can be easily accessed by anyone who has a client computer and Internet access. However, some of this content may be unsuitable or inappropriate for all Internet users. For example, violent or adult content may be inappropriate for children. Therefore, in some situations it is desirable to limit and/or control user access to such content. For example, businesses may want to restrict their employees from viewing certain content on the Internet. Likewise, parents may wish to block their children's access to violent or adult content on the Internet.

This restriction and/or control of user access to content on the Internet is otherwise known as content filtering. content filtering allows a system administrator to block or limit content based on traffic type, file type, Web site, or the like. For example, Web access might be permitted, but file transfers may not.

There have been numerous attempts to provide content filtering using special browsers and filtering programs. These special browsers and filtering programs typically screen content by word content, site rating, or by URL. The software provider of the special browsers or filtering programs typically keep a master list of objectionable content that must be periodically updated in the special browser or filtering program on the user's client computer.

However, these existing content filtering systems have a number of drawbacks. First, they need to be installed and configured on each and every client computer where controlled access is desired. Such installation and configuration can be time-consuming, inconvenient, and require a basic understanding of computer hardware and software. Additionally, from time to time, the user may be required to install bug-fixes, patches, or updates to configure or maintain the filtering software. This is because additional content must be continually added to a list of restricted sites. Typically, this list must be periodically downloaded and installed by a user to his/her client computer. Moreover, the software and continually growing list of restricted sites may consume valuable client computer memory, which, in some cases, may limit or effect overall client computer performance. What is more, many children are typically more computer savvy than their parents and often find ways to circumvent the content filtering software without their parent's knowledge.

Another approach to content filtering has been to place filtering software on a proxy server, so that entire networks connected to the proxy server can be filtered. The proxy server typically contains a list of restricted content that is periodically updated. However, each client computer connected to the proxy server must typically also include software that includes the filtering requirements appropriate for that particular client computer. Again this requires software to be installed and configured for each client computer. This is not only time consuming and inconvenient, but may consume much of a system administrators time. If each client computer is not appropriately configured, users may be blocked from content that they should otherwise have access to. Conversely, children and other restricted users may be able to get access to inappropriate content using a particular client computer that has not been configured to restrict such content.

In addition, updating lists of objectionable content is itself a challenge, as it has been estimated that approximately two million Web pages are added to the Internet each day. What is more, Internet search engines tend to display search results with the most recent content listed first. As a result, inappropriate content may actually be listed first in a list of search results, thereby rendering filtering software that does not include this content on its restricted list, ineffectual. Conventional content filtering has several other limitations., such as content filtering is provided on a computer by computer basis.

Therefore, a need exists for a content filtering system that is easily provisioned for one or more client computers with little or no user intervention, such as installation and configuration of software, or updating a list of filtered content, onto the user's client computer. Moreover, a need exists for a filtering system that cannot easily be circumvented, bypassed, tampered with, or disabled at the client computer level.

SUMMARY OF THE INVENTION

According to the invention there is provided a remotely configurable content filtering system. This content filtering system provides users with the ability to filter content on a network. For example, a parent can limit the access that a child has to content by blocking access to content unsuitable to children. The parent can also configure the content filtering system to block different content for different children, based on the age of each child. The content filtering settings can also be made client-computer-specific. For example, if an adult is using one client computer and a child is using another client-compute, the content filtering can be turned off for the client computer being used by the adult and turned on for the client-compute being used by the child.

The content filtering system is transparent to the user and no software has to be loaded on the user's client-computers. What is more, no special configuration of the users web Browser is required. The content filtering process is performed on the network and not on the individual client-computers. Therefore an individual other than the control setting authority (for example, the parent) will not be able to bypass the content filtering controls previously set.

According to the invention there is provided a method for filtering content using static source routes. A packet containing a request for content is initially received at a content filtering router. The packet comprises a first destination Internet Protocol (IP) address of a content server that stores the content and a second destination IP address of the content filtering router. It is then determined that a first destination IP address is on a list of destination IP addresses to be filtered. The packet is routed to an output port on the content filtering router based on the first destination IP address and the list.

Further according to the invention there is provided another method for filtering content using static source routes. A packet containing a request for content is initially received at an Internet Protocol (IP) communications device. The packet comprises a source IP address of a client computer from where the request originated and a first destination IP address of a content server that stores the content. It is then determined that the request is to be subjected to a content filtering service, based on the destination IP address. A second destination IP address of a content filtering router is added to the packet. Finally, the packet is sent toward the content filtering router.

Still further according to the invention there is provided a content filtering router. This router comprises a Central Processing Unit (CPU), communications circuitry, input ports, output ports, and a memory. The memory includes an operating system and communication procedures configured to receive a packet containing a request for content. The packet comprises a first destination Internet Protocol (IP) address of a content server that stores the content and a second destination IP address of the content filtering router. The memory also includes a routing protocol having instructions for determining whether the first destination IP address is on a list of destination IP addresses to be filtered, and instructions for routing the packet to one of the output ports based on the first destination IP address and the list. Additionally, the memory has a routing table containing the list.

Moreover, according to the invention there is provided a computer program product for use in conjunction with a computer system for content filtering. The computer program product comprises a computer readable storage and a computer program stored therein. The computer program includes instructions for receiving at an Internet Protocol (IP) communications device a packet containing a request for content. The packet comprises an source IP address of a client computer from where the request originated and a first destination IP address of a content server that stores the content. The computer program also includes instructions for determining that the request is to be subjected to a content filtering service, based on the destination IP address, instructions for adding a second destination IP address of a content filtering router to the packet, and instructions for sending the packet toward the content filtering router.

Finally, according to the invention there is provided a system for content filtering. The system includes an Internet Protocol (IP) communications device coupled between at least one client computer and at least one filtering router. The IP communications device is configured to route requests for content received from the at least one client computer toward the at least one filtering router. The at least one filtering router is configured to route the requests for content someplace other than a content server that stores the content when the content server's IP address is on a list of addresses to be filtered stored on the content filtering router.

BRIEF DESCRIPTION OF THE DRAWINGS

Additional objects and features of the invention will be more readily apparent from the following detailed description and appended claims when taken in conjunction with the drawings, in which:

Like reference numerals refer to corresponding parts throughout the several views of the drawings.

DESCRIPTION OF THE PREFERRED EMBODIMENTS

Figure 1:
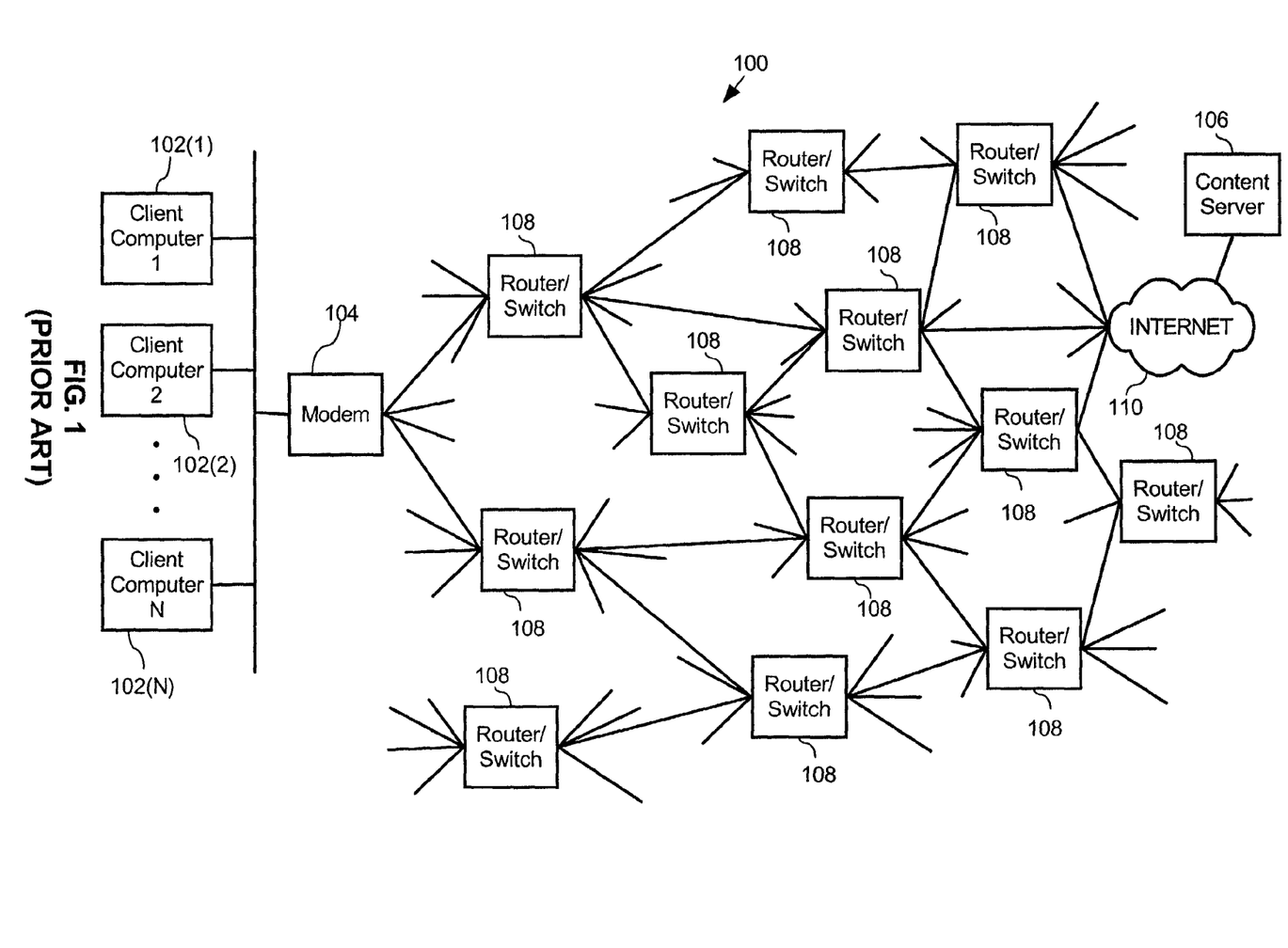
FIG. 1 is a schematic of the typical system architecture for connecting to the Internet.

FIG. 1 is a schematic of the typical system architecture 100 for connecting to the Internet. Typically one or more client computers 102(1)-(N) connect to a modem 104, such as a dial-up modem, which in turn connects to the Internet 110 via one or more routers or switches 108.

A router is a device that forwards data packets from one computer network to another. Based on routing tables and routing protocols, routers read the network address in each transmitted frame or packet and make a decision on how to send it based on the most expedient route (traffic load, line costs, speed, bad lines, etc.). Routers work at layer 3 in the protocol stack, i.e., the network layer, whereas bridges and switches work at the layer 2, i.e., the data link (Media Access Control layer (MAC)) layer.

Requests for content located on the Internet 110 are transmitted from the client computers 102(1)-(N) to the modem 104 in a frame or packet. The modem 104 then forwards the packet to a first router or switch 108 which in turn forwards the packet to the next router or switch 108, and so on until the packet reaches its intended destination, namely content server 106, coupled to the Internet 110. The content server 106 then serves the requested content back to the client computer 102(1)-(N) that made the request via the most expedient route, i.e., via the same or other routers or switches 108.

Each packet request contains an Internet Protocol (IP) header having at least one source IP address, at least one destination IP address, and data, such as a request for content. The source IP address is typically the IP address of the client computer 102(1)-(N) that made the request, while the destination IP address is typically the IP address of the content server 106.

Figure 2:
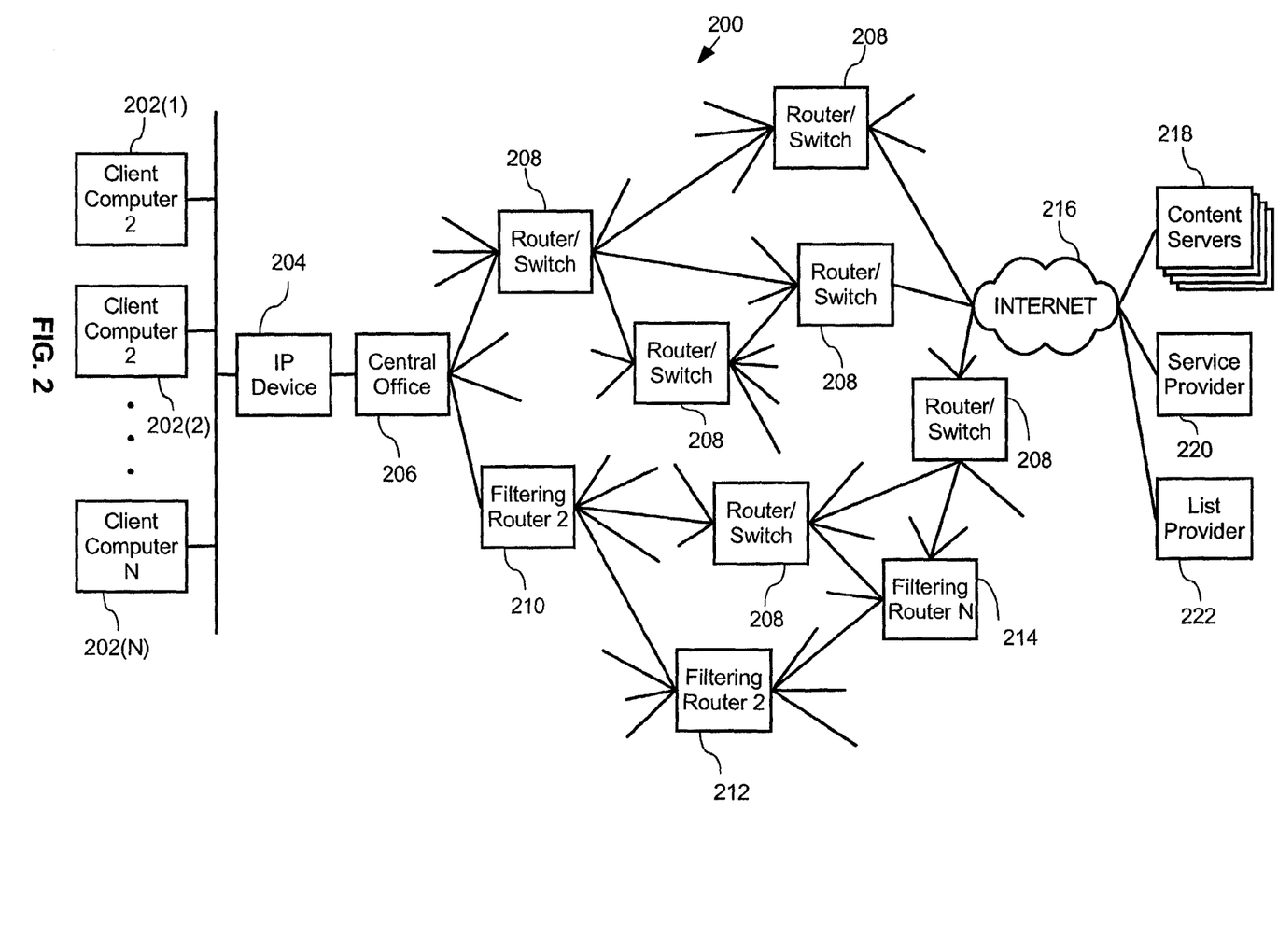
FIG. 2 is a schematic of a system architecture for content filtering according to an embodiment of the invention.

The system architecture of a content filtering system 200 according to an embodiment of the invention is shown in FIG. 2. The content filtering system 200 prevents a user from accessing unauthorized content located on a network, such as the Internet 216. Unauthorized content may include undesirable, inappropriate, or extreme content, such as violence, hate, gambling or adult content.

One or more client computers 202(1)-(N) connect to a bidirectional IP communication device (IP device) 204. The client computers 202(1)-(N) and IP device 204 are coupled to one another by any suitable means, such as Ethernet, cable, phone line, optical fiber, wireless, or the like. The client computers 202(1)-(N) include any computing device, such as desktop computers, laptop computers, handheld computers, or the like. Each of the client computers 202(1)-(N) includes network access software, such as an Internet Browser, like MICROSOFT'S INTERNET EXPLORER or NETSCAPE'S NAVIGATOR. Unlike the prior art, such network access software does not need to be specially configured for the content filtering system 200. In fact, no filtering software needs to be present on the client computers 202(1)-(N) whatsoever. In addition, each client computer 202(1)-(N) is uniquely identifiable by a unique source IP address.

The IP device 204 is any communication device that transmits and receives data over IP, preferably a broadband modem or gateway, such as a Digital Subscriber Line (DSL) or cable modem/gateway.

The IP device 204 also preferably connects to a central office 206. The central office 206 may be a local telephone company switching center (for DSL), a cable company's central office (for cable), a Internet Service Provider's (ISPs) Point of Presence (POP) (for dial-up), or the like.

The central office 206 is coupled to the Internet 216 via one or more routers or switches 208 and one or more filtering routers 210, 212, and 214. The routers or switches 208 are the same as the routers or switches 108 described in relation to FIG. 1. The filtering routers 210, 212, and 214 are routers that are used for content filtering as described in further detail below. Each filtering router 210, 212, or 214 is used to filter one category of content, where a category is a type or level of content, such as violent, adult, religious content, or the like. For example, filtering router 210 is used to filter violent content while filtering router 212 is used to filter adult content.

Content servers 218, a service provider 220, and a list provider 222 are also coupled to the Internet 216. The content servers 218 store and serve content to client computers 202(1)-(N), while the service provider 220 provides the content filtering service described below. The list provider 222 generates, stores, and provides a list of questionable content that may be unsuitable or inappropriate and, therefore, subject to the filtering system. Such a list of content preferably contains numerous URLs or IP addresses of the location of such questionable content. The list also preferably contains each questionable content's associated category, such as religion, entertainment, and adult content. This allows the content filtering system to selectively customize the filtering system for each individual user. A suitable list provider 222 is WEBSENSE of California U.S.A. WEBSENSE's list of filtered content currently contains 2.6 million Web sites, covering 500 million Web pages.

Figure 3:
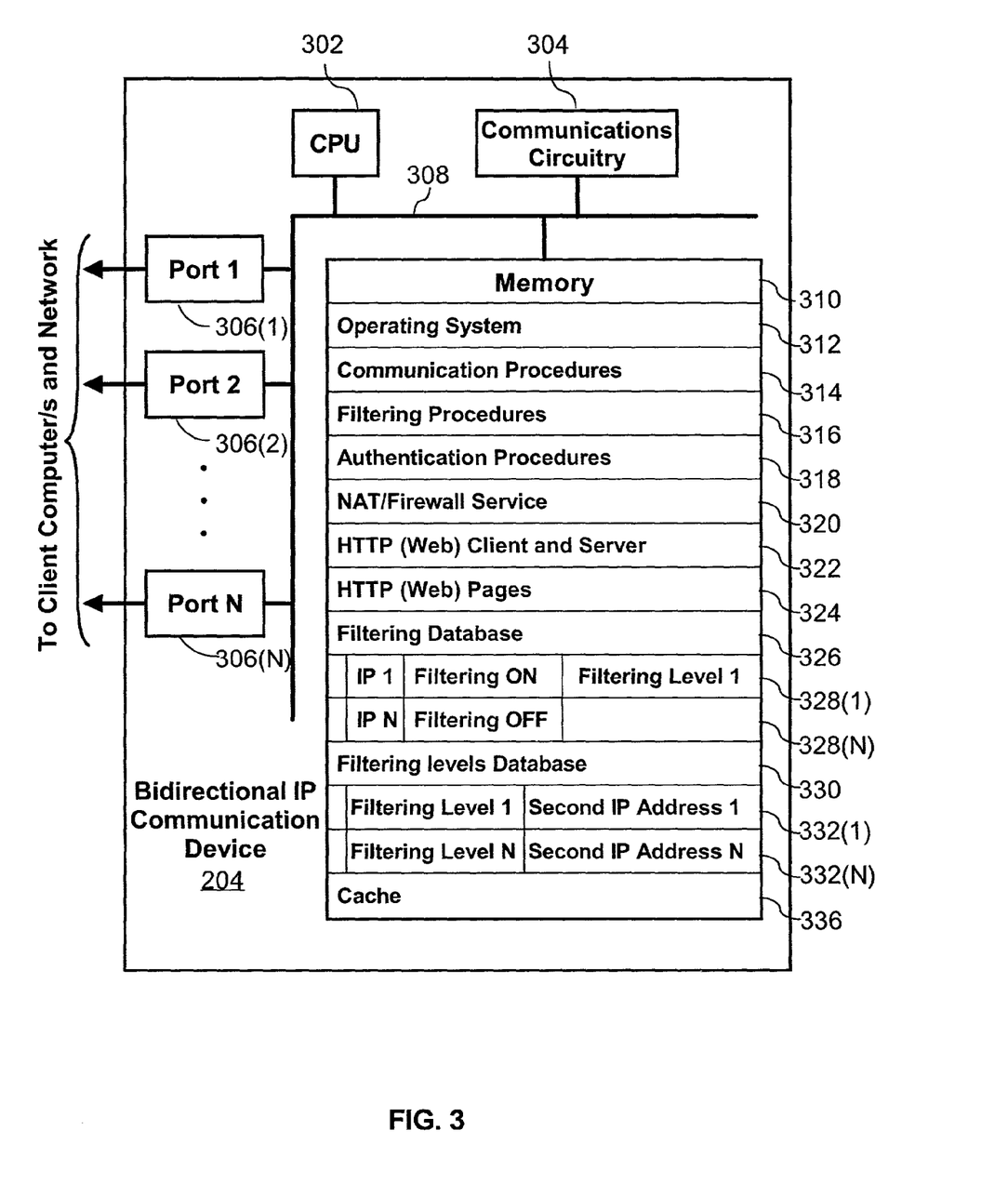
FIG. 3 is a block diagram of the bidirectional IP communication device shown in FIG. 2.

FIG. 3 is a block diagram of the IP device 204 shown in FIG. 2. The IP device 204 preferably comprises at least one data processor or central processing unit (CPU) 302, a memory 310, communications circuitry 304, communication ports 306(1)-(N), and at least one bus 308 that interconnects these components. The communications circuitry 304 and communication ports 306(1)-(N) preferably include one or more Network Interface Cards (NICs) configured to communicate over Ethernet with the client computers 202(1)-(N) (FIG. 2).

Memory 310 preferably includes an operating system 312, such as VXWORKS or EMBEDDED LINUX, having instructions for processing, accessing, storing, or searching data, etc. Memory 312 also preferably includes communication procedures 314; filtering procedures 316; authentication procedures 318; a Network Address Translation (NAT)/Firewall service 320; a HTTP (Web) Client and Server 322; HTTP (Web) Pages 324; a filtering database 326; a filtering levels database 330; and a cache 336 for temporarily storing data.

The communication procedures 314 are used for communicating with both the client computers 202(1)-(N) (FIG. 2), and the Internet 216 (FIG. 2). The filtering procedures 316 are used for filtering content as explained in further detail below. The authentication procedures 318 are used to authenticate a user for content filtering services. The NAT/Firewall service 320 converts a local IP address of each client computer 202(1)-(N) (FIG. 2) into a globally routable IP address for the Internet and vice versa. It also serves as a firewall by keeping individual IP addresses of the client computers hidden from the outside world.

The HTTP (Web) Client and Server 322 requests and serves the HTTP (Web) Pages 324. The filtering database 326 contains a table 328(1)-(N) of: Source IP addresses for each client computer 202(1)-(N) connected to the IP device 204; an indication of whether the filtering service is active for each Source IP address; and an indication of the filtering level for each active Source IP address. The filtering level is preferably a number that indicates the level of filtering that requests from a particular client computer are subject to. For example, all requests from client computer 202(1) may be subject to filtering level 1, which means that requests for content originating from client computer 202(1) will only be subject to filtering for say violent content.

The filtering levels database 330 contains a table 332(1)-(N) listing various filtering levels and the IP address of the filtering router that is configured to filter all requests for that filtering level. For ease of explanation, the IP address of each filtering router 210, 212, or 214 (FIG. 2) will hereafter be referred to as a second destination IP address, as compared to a first destination IP address of the content server. For example, if it is determined that requests from a particular client computer are subject to filtering level 3, then such requests are routed first to a filtering router for level one, then to a filtering router for level three, and finally to a filtering router for level three. This filtering system is explained in further detail below. The IP device 204 also contains a cache 336 for temporarily storing data.

Figure 4:
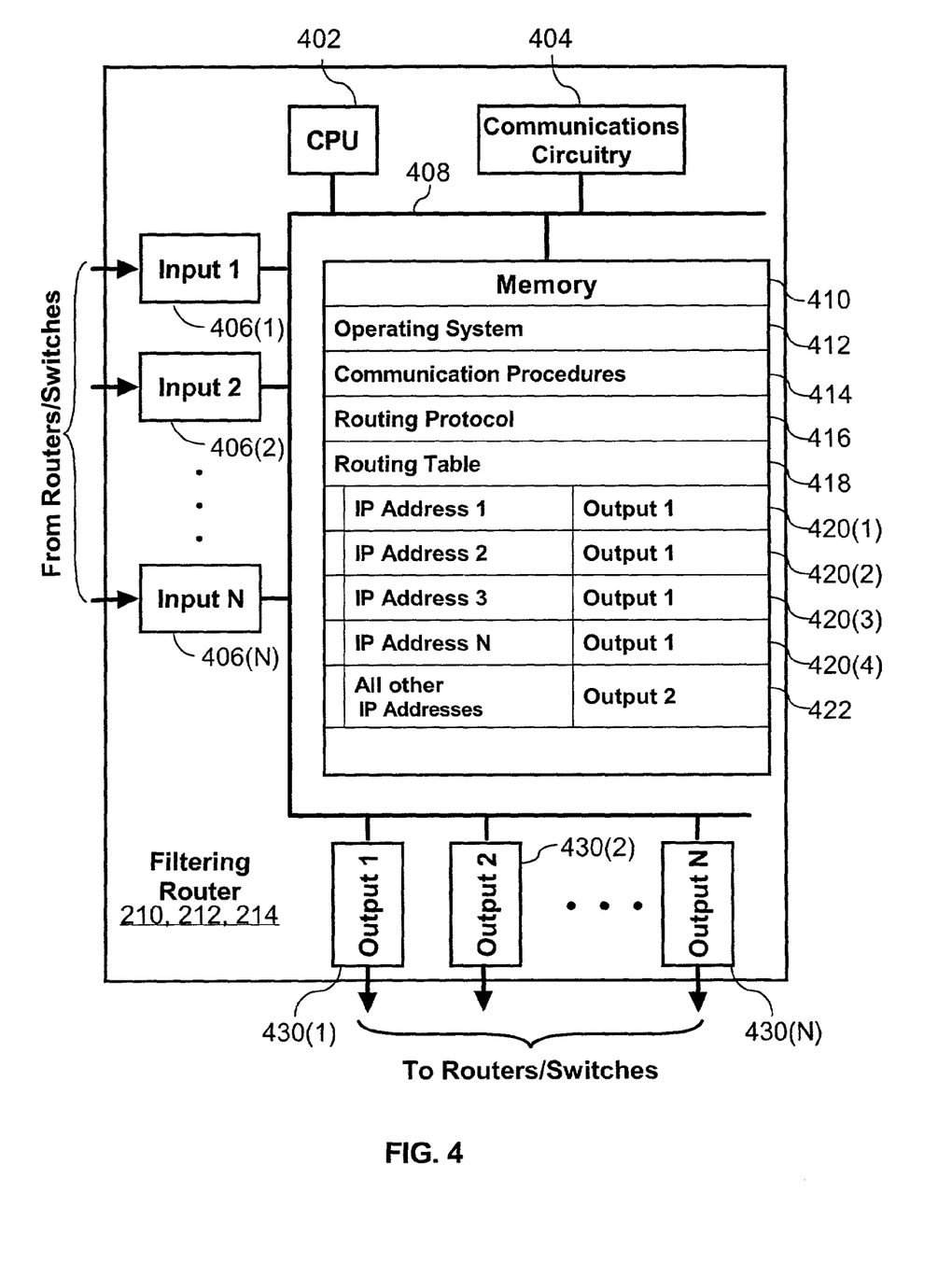
FIG. 4 is a block diagram of the filtering router shown in FIG. 2.

FIG. 4 is a block diagram of the filtering router 210, 212, or 214 shown in FIG. 2. The filtering router 210, 212, or 214 preferably comprises at least one data processor or central processing unit (CPU) 402, a memory 410, communications circuitry 404, input ports 406(1)-(N), output ports 430(1)-(N), and at least one bus 408 that interconnects these components.

The communications circuitry 404, input ports 406(1)-(N), and output ports 430(1)-(N) are used to communicate with the client computers 202(1)-(N) (FIG. 2), routes/switches 208 (FIG. 2), and the Internet 216 (FIG. 2).

Memory 410 preferably includes an operating system 412, such as VXWORKS or EMBEDDED LINUX, having instructions for processing, accessing, storing, or searching data, etc. Memory 412 also preferably includes communication procedures 414; a routing Protocol 416, such as the Border Gateway Protocol (BGP); and a routing table 418, such as a BGP routing table. BGP is a routing protocol that is used to span autonomous systems on the Internet. BGP is used by the filtering routers 201, 212, and/or 214 to determine the appropriate path to forward data toward. BGP is a robust, sophisticated and scalable protocol that was developed by the Internet Engineering Task Force (IETF). For further information on BGP please see Request for Comments (RFCs) 1105, 1163, 1164, 1265, 1266, 1267, 1268, 1269, 1397, and 1403 all of which are incorporated herein by reference.

The routing table 418 comprises a list of IP addresses and their associated output port numbers 420(1)-(5) and 422. The list of IP addresses partially contains the IP addresses 420(1)-(5) of content that is to be filtered by a particular filtering router 210, 212, and/or 214. For example, filtering router 210 contains a list of all IP addresses 420(1)-(5) for a specific category, such as violent content. Each IP address 420(1)-(5) of content that is to be filtered is routed to a particular output port, such as output port 1. This effectively routes a request for filtered content to someplace other that the destination IP address (first IP address) of the content server 218 (FIG. 2) that stores the content. Requests directed to all other IP addresses 422, i.e., the IP addresses of non-filtered content, are routed to another port, such as port 2, and onward toward the destination IP address (first IP address). A more detailed explanation of this process is provided below in relation to FIGS. 7A and 7B.

Figure 5:
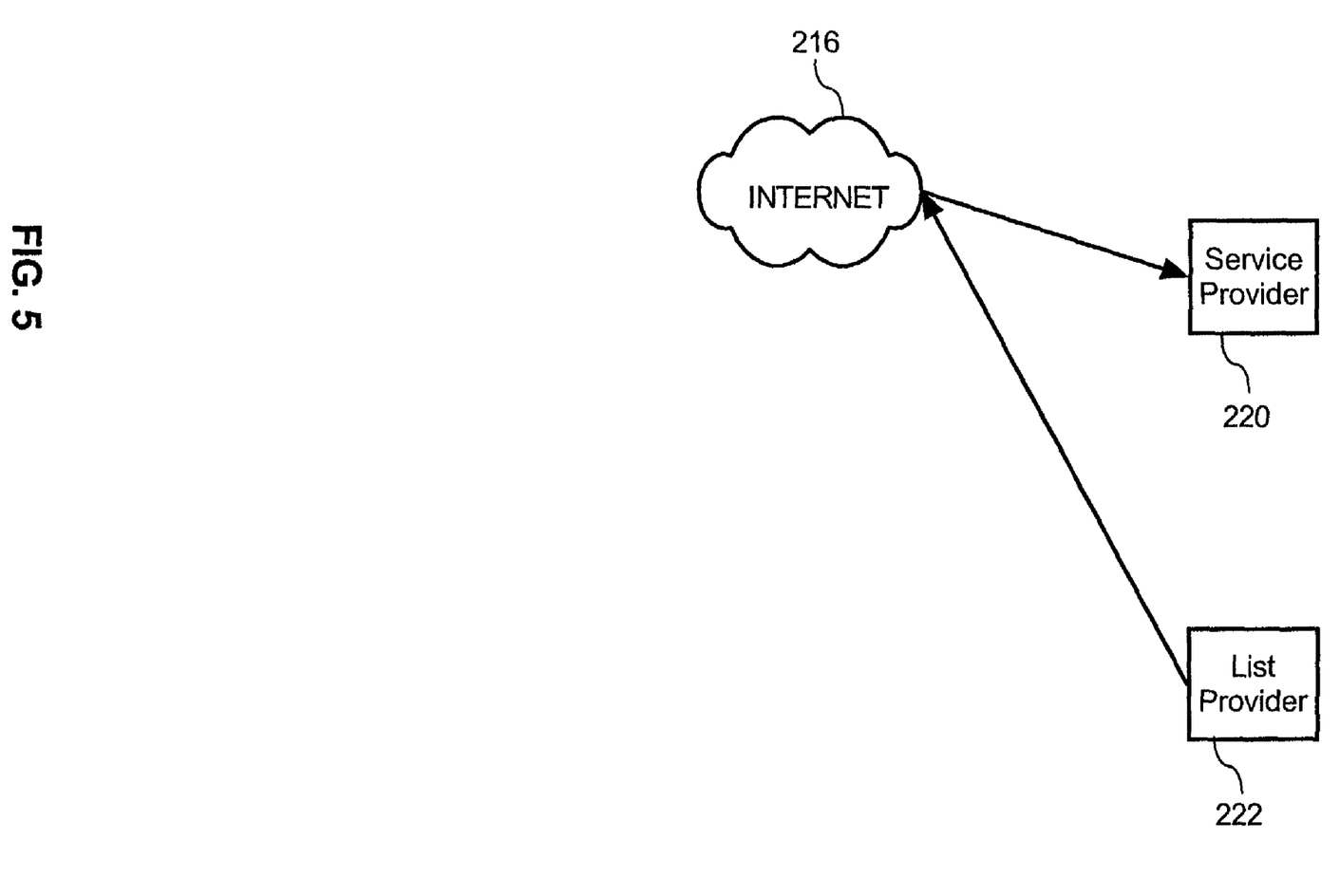
FIG. 5 is a route diagram of a process for updating a filter list on the service provider shown in FIG. 2.

FIG. 5 is a route diagram of a process for updating a filter list on the service provider 220 shown in FIG. 2. Periodically, or whenever the filter list is updated, the list provider 222 transmits 710 the filter list to the service provider 220, preferably via the Internet 216. The service provider then saves 708 the list. Once the updated filter list has been received by the service provider from the list provider, the service provider 218 breaks down the list into individual categories, such as violence, pornography, etc, and associates a particular output port 430 (FIG. 4) of a particular filtering router 210, 212, or 214 with each IP address to be filtered. The service provider then sends the list having individual categories and output ports to the content filtering router, which accepts 706 the list and stores 712 it in its routing table.

Figure 6:
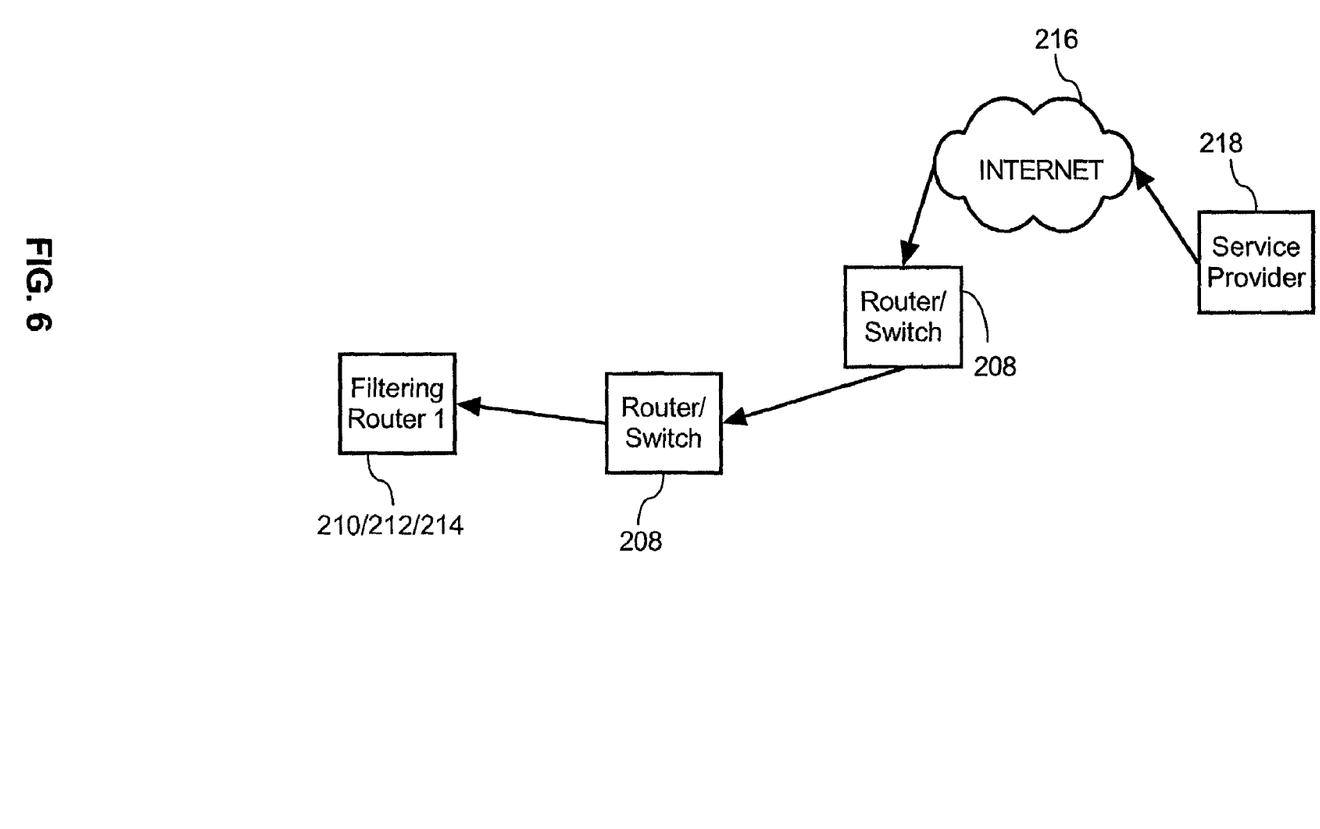
FIG. 6 is a route diagram of a process for updating a filter list on a content filtering router shown in FIG. 2.

FIG. 6 is a route diagram of a process for updating a filter list on a content filtering router shown in FIG. 2. Each individual category has its own filter list, which is then transmitted to the particular filtering router 210, 212, or 214 configured to filter the specific category. These individual category lists are preferably transmitted via the Internet 216 and various routers and/or switches 208. The filtering router 210, 212, or 214 then stores the received filter list in its routing table 418, preferably overwriting any previous list.

Figure 7A:
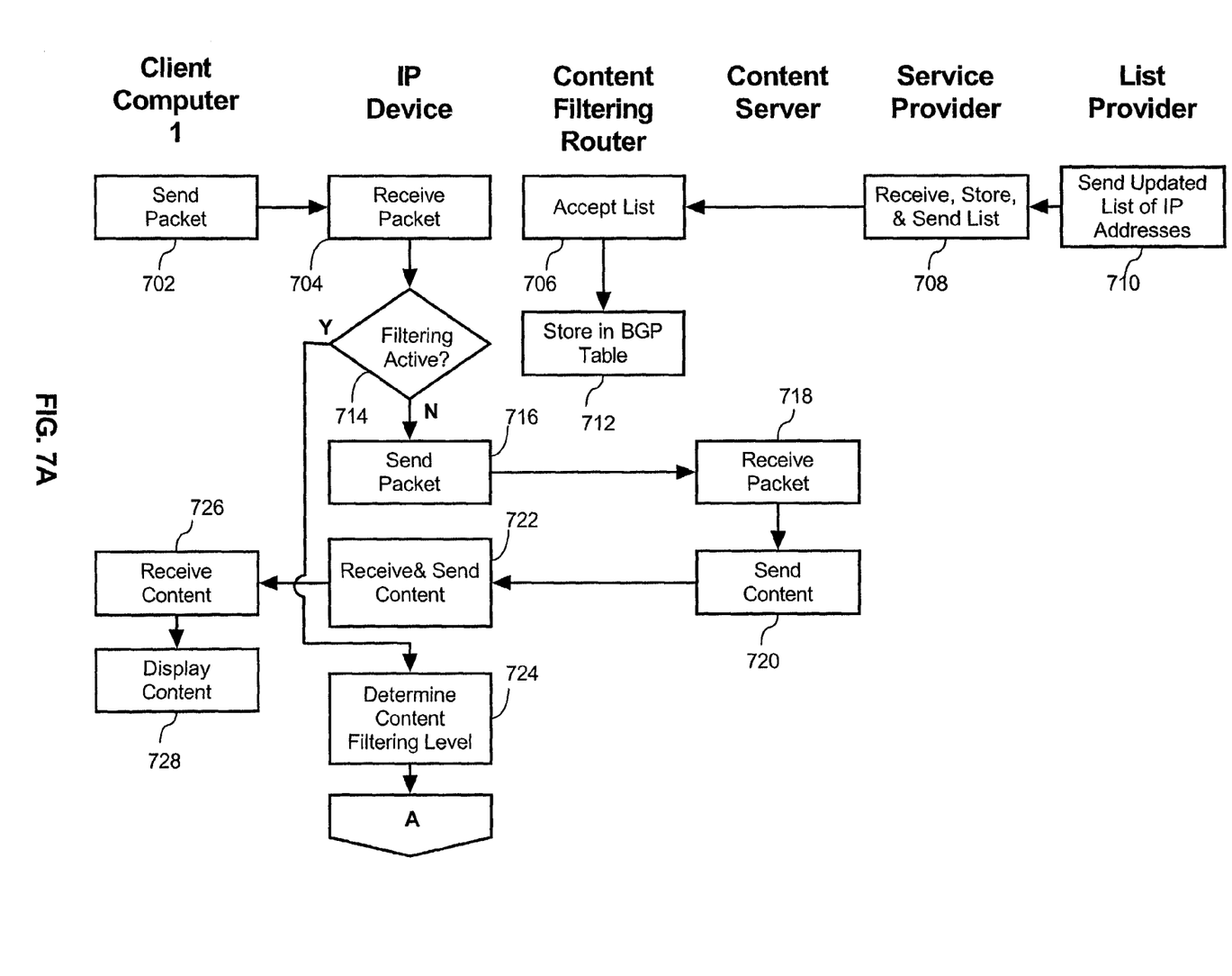
FIGS. 7A-7B are flow charts of a method for content filtering according to an embodiment of the present invention.
Figure 7B:
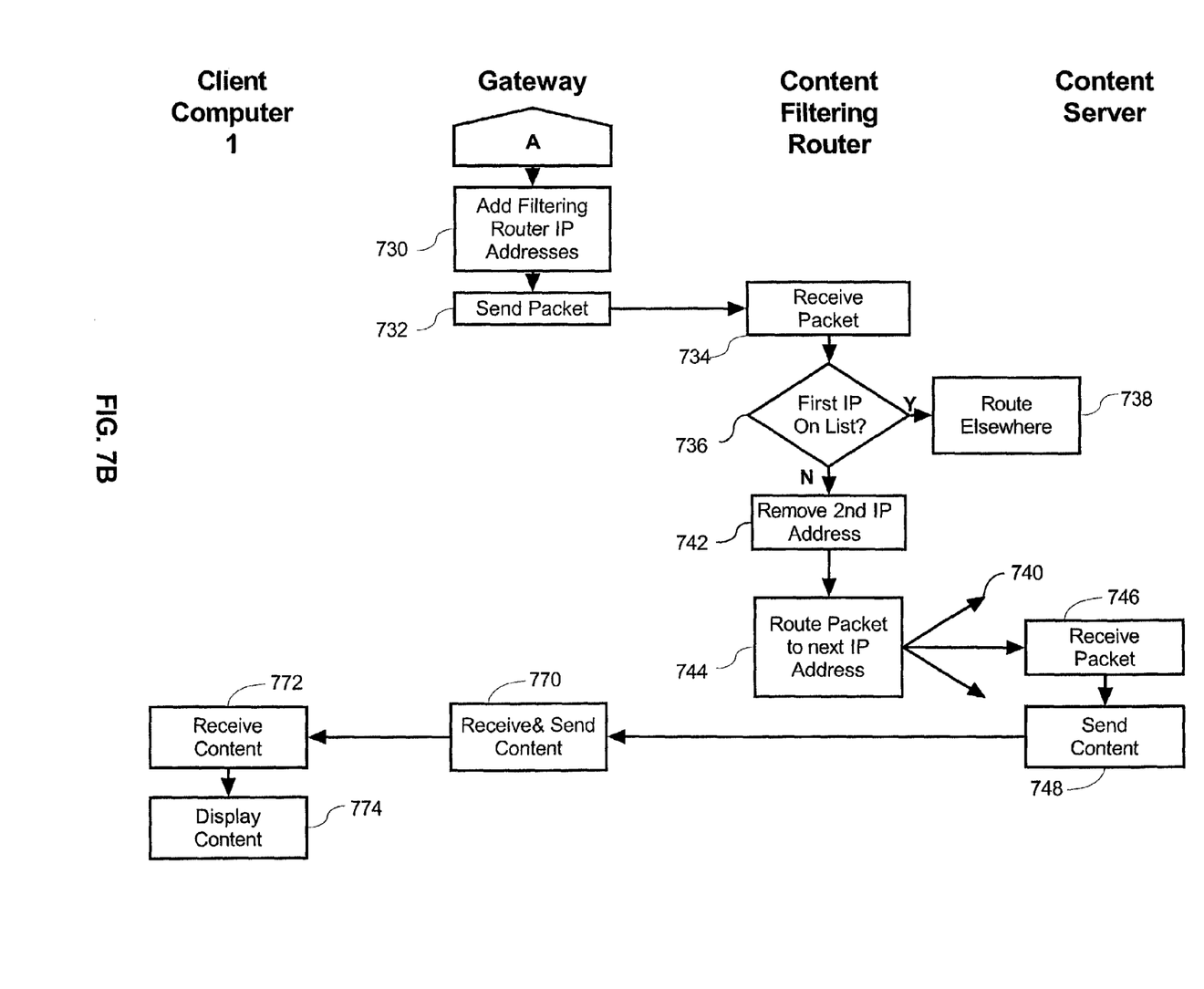

FIGS. 7A-7B are flow charts of a method for content filtering according to an embodiment of the present invention. Using any method for requesting content from a content server 218 (FIG. 2), a user of a client computer 202(1)-(N) (FIG. 2) sends 702 a packet containing a request for content to the IP device 204 (FIG. 2). The packet is received 704 by the IP device, which then determines 714 if the filtering system is active for the particular client computer that made the request. This is determined by looking up the IP address 328(1)-(N) (FIG. 3) of the client computer that made the request, in the filtering database 326 (FIG. 3) on the IP device.

If it is determined that the filtering system is not active for the client computer that made the request (714—No), then the packet is sent 716 to the content server that stores the requested content. The content server receives 718 the packet and locates and serves or sends 720 the content back to the IP device. The IP device receives and sends 722 the content onto the client computer that made the request. The client computer receives 726 and displays 728 the content.

If it is determined that the filtering system is active for the client computer that made the request (714-Yes), then the IP device determines 724 the content filtering level for the particular client computer that made the request. This is done by looking up the corresponding filtering level 328(1)-(N) (FIG. 3) for the IP address of the client computer that made the request. Alternatively, the IP device might require a user identifier and password from the user to apply a filtering level on a user by user basis rather than on client computer by client computer basis.

Depending on the filtering level to be applied, the IP device then adds static source routing details to the packet. Specifically, the IP device adds 730 one or more filtering router IP addresses (second destination IP addresses) to the IP header of the packet reserved for "Source Route Options." Each filtering router then acts as an intermediate hop in a source route, forwarding the source-routed packet to the next specified hop, such as to another filtering router or towards the content server. This is otherwise known as static routing, which is performed using pre-configured routing tables which remain in effect indefinitely. Dynamic routing, on the other hand, uses special routing information protocols to automatically update the routing table with routes known by peer routers. Further information of static source routing can be found in Request for comments 1122 and 1716, both of which are hereby incorporated by reference.

Each one or more filtering router IP addresses (second destination IP address) is the IP address for a different filtering router 210, 212, or 214. The packet might be sent to one or more filtering routers depending on the filtering level for a particular client computer. Each filtering router filters for a different category of filtered content. For example, if a user has subscribed to a filtering service to filter pornographic and violent content, but not religious content, each request for content will be sent to both a filtering router for pornographic content and a filtering router for violent content.

Once the filtering router IP address/es (second destination IP address/es) has been added to the packet, the IP device then sends 732 the packet towards the content filtering router specified in the IP header of the packet. The packet is received 734 by the content filtering router 210, 212, or 214 (FIG. 2), which then determines 736 whether the content server IP address (first destination IP address) is on the list 420 (1)-(5) (FIG. 4) of IP addresses to be filtered in the routing table 418 (FIG. 4).

If the content server's IP address (first destination IP address) is not on the list (736—No), then the filtering router's IP address (second destination IP address) is preferably removed 742 from the IP header of the packet. This is done to avoid the content from having to return to the client computer via the filtering router, thereby allowing the content to find the most efficient route back to the client computer using dynamic routing. The packet is then routed 744 to the next destination IP address in the IP header.

If the next destination IP address in the IP header is the IP address of another filtering router, i.e., where the request for content is to be filtered for restricted content in a different category, such as violent content, then the packet is routed 744 to the next filtering router (as indicated by arrow 740). The process that occurs at each subsequent filtering router is similar to that described above.

If the next destination IP address is the IP address of the content server (first IP address), i.e., the content server's IP address is not on the routing table 418 (FIG. 4) and there are no further IP addresses for other filtering routers in the IP header, then the packet is routed 744 to the content server 218 (FIG. 2). The content server then receives 746 the packet and serves or sends 748 the content toward the gateway. The content is then dynamically routed back to the IP device. The content is received and sent 770 by the IP device to the IP address of the client computer that made the request. The client computer subsequently receives 772 and displays 774 the content.

If, however, the content server IP address (first destination IP address) is on the list (736-Yes), then the packet requesting the filtered content is routed 738 someplace other than to the content server 218 (FIG. 2) that stores and serves the requested content. For example, if the requested content contains pornographic material that is to be filtered by a particular filtering router, then the (IP address of the content server storing and serving such content will be on the list of IP addresses 420(1)-(5) (FIG. 4) on the routing table 418 (FIG. 4) of that filtering router.

In one embodiment, the packet is simply routed to an output port 430 (FIG. 4) that is not coupled to anything, and the packet is simply discarded. In this case, the user will simply be informed that the content cannot be found. Alternatively, the packet can be sent to the service provider 220, which in turn can send a message to the client computer that made the request, informing the user that the requested content has been blocked or filtered. In yet another embodiment the packet can be sent to the service provider, which in turn sends an authentication message to the user. The user must then supply a username and password to turn off the filtering system or allow a lower filtering level, i.e., allow the user to view more content.

Figure 8A:
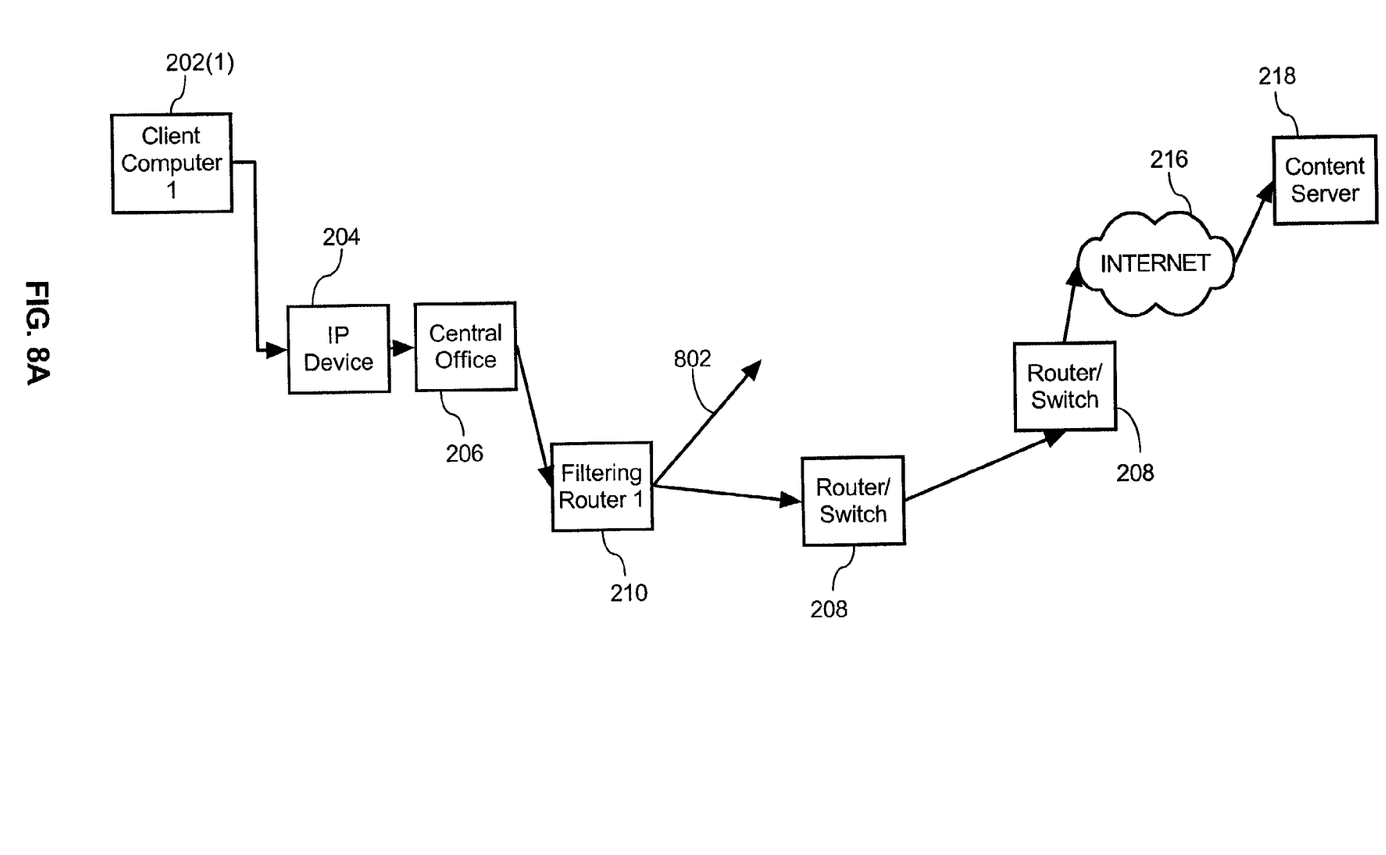
FIG. 8A is a route diagram of a request for content that is filtered by a single filtering router according to the method described in relation to FIGS. 7A and 7B.

FIG. 8A is a route diagram of a request for content that is filtered by a single filtering router 210, according to the method described in relation to FIGS. 7A and 7B. In this scenario, the filtering service is configured to only filter a single category of content, such as violent content. The filtering router that filters this particular category is filtering router 210.

The packet containing the request for content travels from the client computer 202(1) to the IP device 204. The IP device adds a second destination IP address of the filtering router 210 to the IP header of the packet and transmits the packet to the central office 206. The central office 206 forwards the packet towards the filtering router 210. The filtering router then checks whether the first IP address of the content server 218 to where the request was directed is on its routing table. If the first IP address is on the routing table, the filtering router routes the packet someplace other (802) than the content server. If the first IP address is not on the routing table, the filtering router routes the packet towards the content server 218. On its way to the content server 218 the packet may pass through other routers or switches 208.

Figure 8B:
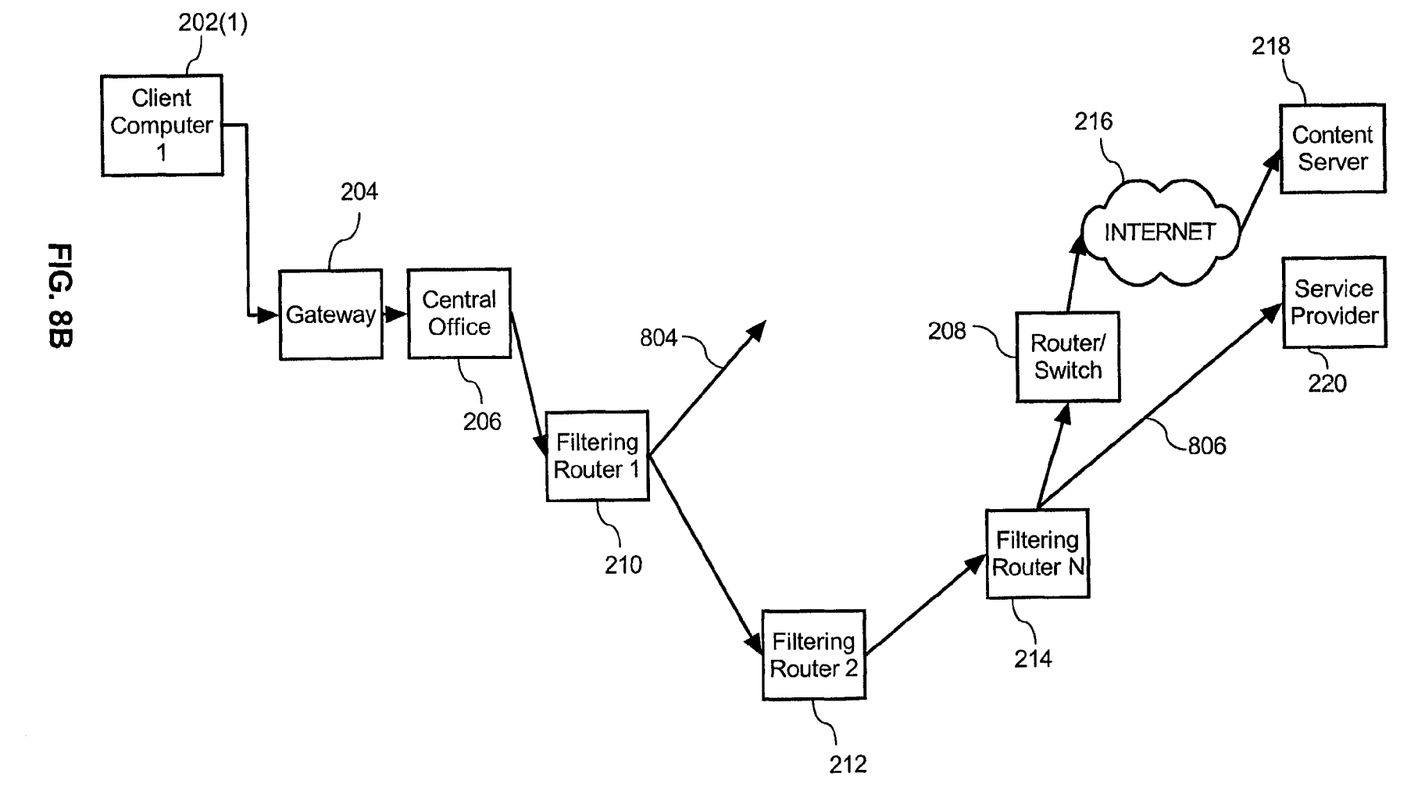
FIG. 8B is a route diagram of a request for content that is filtered by multiple filtering routers according to the method described in relation to FIGS. 7A and 7B.

FIG. 8B is a route diagram of a request for content that is filtered by multiple filtering routers 210, 212, and 214 according to the method described in relation to FIGS. 7A and 7B. In this scenario, the filtering service is configured to filter three categories of content, such as violent, adult, and religious content. Here, the IP device adds three second destination IP addresses of the filtering routers 210, 212, and 214 to the IP header of the packet. Once the first filtering router 210 ascertains that the first IP address is not on the routing table, the first filtering router 210 routes the packet towards the second filtering router 212, and so on. If it is ascertained that the first IP address is on one of the routing tables of the filtering routers, then that filtering router can either discard (802) the packet or route the packet towards the service provider 220, as explained above in relation to FIGS. 7A and 7B.

Figure 9:
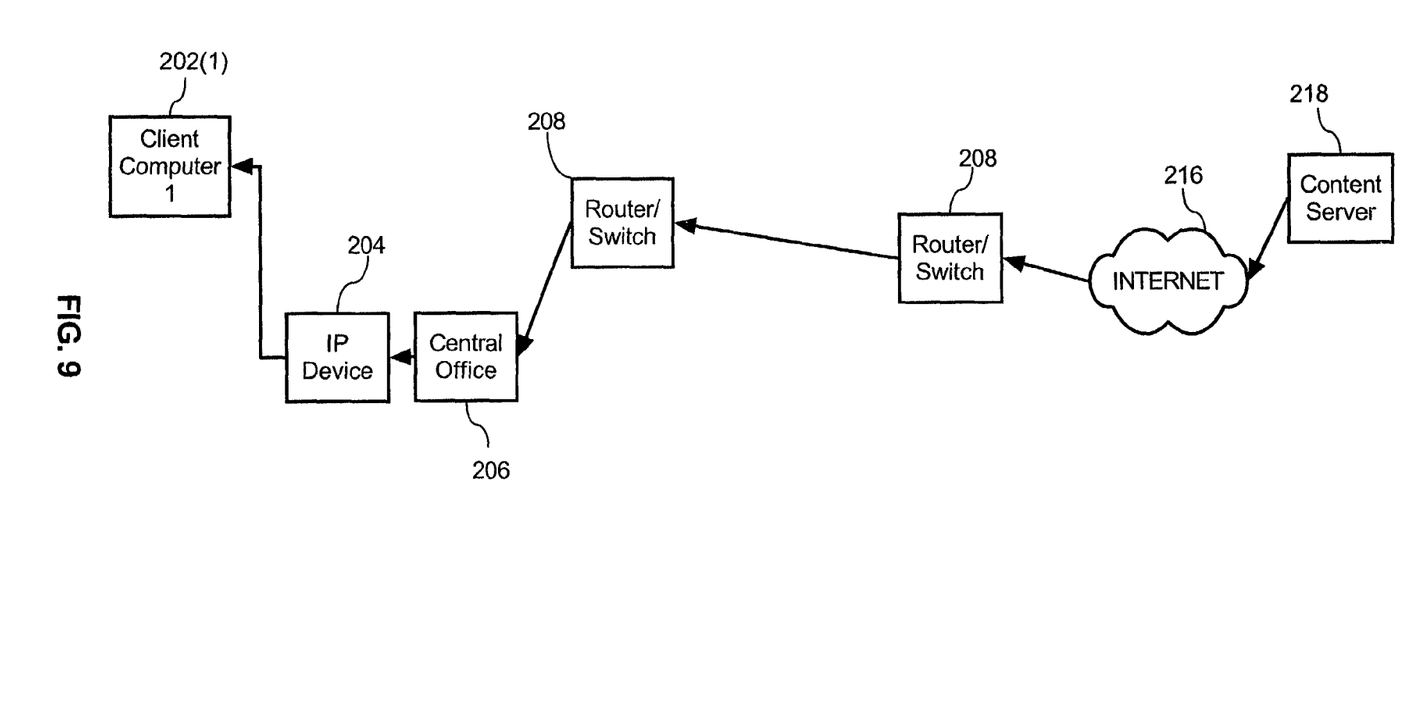
FIG. 9 is a route diagram of the return path of the content to a client computer according to the method described in FIGS. 7A and 7B.

FIG. 9 is a route diagram of the return path of the content to the client computer 202(1) according to the method described in FIGS. 7A and 7B. If the first destination IP address of the content server 218 is not on a routing table of a filtering router through which the packet was routed, then the packet is sent to the content server 218. Once the content server receives the packet containing the request for content, it locates the content and transmits it back toward the source IP address of the client computer that made the request. The content is routed dynamically back to the client computer along the most efficient path available.

In this way, routers can be used to filter content stored on a network. What is more, filtering software need not be stored or updated on any of the client computers. Periodically, if necessary, a revised list of IP addresses for the filtering routers can be sent to and stored in the filtering levels database 330 (FIG. 3) on the IP device. An updated list of the IP addresses of each client computer that has subscribed to the service, and its filtering level, can also periodically be sent to and stored in the filtering database of the IP device. This allows for a maintenance free system for the user that can be remotely updated from the service provider 220 (FIG. 2).

An advantage of the content filtering process is that because the content filtering process is managed through the IP device, the filtering requirements and criteria only need to be set up once, and all client computers are automatically subject to the filtering service. In this way, individual client computers do not need to be individually configured. In addition, the filtering process does not require restricting users to only certain devices in order for the filtering process to be effective. Additionally, the filtering process requires little user interaction. Updating the content filter database on the content filtering server is preferably performed automatically.

While the foregoing description and drawings represent the preferred embodiment of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description. Furthermore, it should be noted that the order in which the process is performed may vary without substantially altering the outcome of the process.

What is claimed is:

1. A method for filtering content, comprising:
   receiving at a content filtering router a packet containing a request for content, where said packet comprises a first destination Internet Protocol (IP) address of a content server that stores said content and a second destination IP address of said content filtering router;
   determining whether said first destination IP address is on a list of destination IP addresses to be filtered; and
   routing said packet to an output port on said content filtering router based on said first destination IP address and said list.

2. The method of claim 1, wherein said determining comprises ascertaining that said first IP address is on said list, and wherein said routing comprises directing said packet someplace other than said first destination IP address.

3. The method of claim 2, wherein said directing comprises sending said packet to an additional content filtering router, where said packet comprises a third destination IP address of said additional content filtering router.

4. The method of claim 2, wherein said directing comprises sending said packet to a service provider, such that said service provider can notify a user who made said request that said content has been blocked.

5. The method of claim 4, wherein said storing comprises saving said first destination IP address and said associated output port in a routing table on said content filtering router.

6. The method of claim 1, wherein said determining step comprises ascertaining through which output port said packet should be forwarded based on said first destination IP address and a routing table stored on said content filtering router.

7. The method of claim 6, wherein said ascertaining utilizes a routing protocol to determine said output port.

8. The method of claim 7, wherein said routing protocol is a Border Gateway Protocol (BGP).

9. The method of claim 6, wherein said routing table is a Border Gateway Protocol (BGP) table.

10. The method of claim 1, further comprising, before said receiving,
    accepting said first destination IP address and an associated output port on said content filtering router; and
    storing said first destination IP address and said associated output port in said list on said content filtering router.

11. The method of claim 1, wherein said determining comprises ascertaining that said first IP address is not on said list.

12. The method of claim 11, further comprising removing said second destination IP address from said packet.

13. The method of claim 11, wherein said routing comprises directing said packet toward said first destination IP address.

14. A method for filtering content, comprising:
    receiving at an Internet Protocol (IP) communications device a packet containing a request for content where said packet comprises a source IP address of a client computer from where the request originated and a first destination IP address of a content server that stores said content;
    determining that said request is to be subjected to a content filtering service, based on said destination IP address;
    adding a second destination IP address of a content filtering router to said packet; and
    sending said packet toward said content filtering router.

15. The method of claim 14, further comprising, prior to said adding, determining how many content filtering levels said request is to be subjected to.

16. The method of claim 15, wherein said adding further comprises adding an additional destination IP address to said packet for each of said content filtering levels.

17. The method of claim 14, further comprising:
    receiving said content from said content server, when said first destination IP address was not on a routing table on said content filtering router; and
    sending said content to said source IP address.

18. The method of claim 14, further comprising, before said receiving,
    acquiring said source IP address and an indicator of whether said content filtering service is to be applied to said source IP address;
    storing said source IP address and said indicator.

19. The method of claim 18, wherein said acquiring further comprises obtaining a filtering level associated with said source IP address.

20. The method of claim 14, further comprising, before said receiving,
    acquiring a list of filtering levels and associated second destination IP addresses, where each filtering level is associated with a different second destination IP address of a different content filtering router;
    storing said list of filtering levels and associated second destination IP addresses.

21. A content filtering router, comprising:
    a Central Processing Unit (CPU);
    communications circuitry;
    input ports;
    output ports; and
    a memory containing:
    an operating system;
    communication procedures configured to receive a packet containing a request for content, where said packet comprises a first destination Internet Protocol (IP) address of a content server that stores said content and a second destination IP address of said content filtering router;
    a routing protocol comprising:
    instructions for determining whether said first destination IP address is on a list of destination IP addresses to be filtered;
    instructions for routing said packet to one of said output ports based on said first destination IP address and said list; and
    a routing table containing said list.

22. A bidirectional Internet Protocol (IP) communications device, comprising:
    a Central Processing Unit (CPU);
    communications circuitry; and
    input/output ports; and a memory containing:
    an operating system;
    communication procedures comprising:
    instructions for receiving a packet containing a request for content where said packet comprises an source IP address of a client computer from where the request originated and a first destination IP address of a content server that stores said content; and
    instructions for sending said packet toward a content filtering router;
    filtering procedures comprising:
    instructions for determining that said request is to be subjected to a content filtering service, based on said destination IP address; and
    instructions for adding a second destination IP address of said content filtering router to said packet before it is sent toward said content filtering router.

23. A computer readable storage device having stored thereon a plurality of computer-executable instructions-comprising:
    instructions for receiving at an Internet Protocol (IP) communications device a packet containing a request for content where said packet comprises an source IP address of a client computer from where the request originated and a first destination IP address of a content server that stores said content;
    instructions for determining that said request is to be subjected to a content filtering service, based on said destination IP address;
    instructions for adding a second destination IP address of a content filtering router to said packet; and instructions for sending said packet toward said content filtering router.

24. A system for content filtering, comprising an Internet Protocol (IP) communications device coupled between at least one client computer and at least one filtering router, where said IP communications device is configured to route requests for content received from said at least one client computer toward said at least one filtering router, and where said at least one filtering router is configured to route said requests for content someplace other than a content server that stores said content when said content server's IP address is on a list of addresses to be filtered, where said list is a routing table stored on said content filtering router.

25. The system of claim 24, wherein said at least one filtering router is further configured to route said requests for content to said content server when said content server's IP address is not on said list of addresses to be filtered.

* * * * *